(12) United States Patent
Ho

(10) Patent No.: US 10,652,356 B1
(45) Date of Patent: *May 12, 2020

(54) SYSTEM AND METHOD TO DELIVER AN ELECTRONIC DOCUMENT OVER A DATA NETWORK

(71) Applicant: TP Lab, Inc., Palo Alto, CA (US)

(72) Inventor: Chi Fai Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,584

(22) Filed: Sep. 17, 2018

Related U.S. Application Data

(63) Continuation of application No. 14/854,022, filed on Sep. 14, 2015, now Pat. No. 10,104,198.

(51) Int. Cl.
*H04L 29/08* (2006.01)

(52) U.S. Cl.
CPC .......... *H04L 67/32* (2013.01); *H04L 67/1097* (2013.01)

(58) Field of Classification Search
CPC ....................... H04L 67/32; H04L 67/1097
See application file for complete search history.

(56) References Cited

U.S. PATENT DOCUMENTS

| | | | | |
|---|---|---|---|---|
| 2004/0220997 A1* | 11/2004 | De Saint-Johns | ...... | H04L 51/14 709/201 |
| 2013/0110778 A1* | 5/2013 | Taylor | ................. | G06F 11/1435 707/624 |
| 2014/0289288 A1* | 9/2014 | Ishino | ................. | G06F 16/1824 707/827 |
| 2016/0162370 A1* | 6/2016 | Mehta | ................... | G06F 16/162 707/610 |

* cited by examiner

*Primary Examiner* — Michael A Keller
(74) *Attorney, Agent, or Firm* — North Shore Patents, P.C.; Michele Liu Baillie

(57) ABSTRACT

A delivery system securely delivers an electronic document from a sender device to a recipient device over a data network, where the delivery system stores a delivery container from the sender device containing the electronic document, a recipient identity of the recipient device, a plurality of locations comprising a first location and a second location. The delivery system determines a first current geo-physical location of the delivery storage, compares the first current geo-physical location with the first location, and in response to a match, stores the delivery container in the delivery storage. The delivery system further receives a request to access the electronic document from the recipient device, obtains a second current geo-physical location of the recipient device, compares the second current geo-physical location with the second location, and in response to a match, sends the electronic document to the recipient device.

24 Claims, 10 Drawing Sheets

SYSTEM AND METHOD TO DELIVER AN ELECTRONIC DOCUMENT OVER A DATA NETWORK

BACKGROUND OF THE INVENTION

Field

This invention relates generally to electronic document processing, and more specifically, to delivery of an electronic document over a data network.

Related Art

Electronic corporate and personal documents often contain confidential or private information. However, companies and individuals often send documents through public mechanisms such as email, text messages, SMS, MMS, public social networks, or social network media mobile apps. These public methods route documents from one delivery service provider to another delivery service provider. For example, when an insurance agent sends an email attaching an insurance agreement to a client, the email travels through the insurance agent email server, to one or more email service providers, and eventually to the email service provider servicing the client. In this scenario, the insurance agent has no assurance that the agreement is delivered properly to the client, or when the agreement will be delivered, as the email may be dropped or failed to be delivered by any one of the email servers in the route, or the email may be delayed for many days in an email server. On the other hand, the client may not know that the insurance agent has sent the agreement, or when the client will receive the email. Even when the client receives an email marked with her insurance agent and the attached agreement, the client may be concerned the email is not genuine and the attached agreement may contain a security threat such as a virus.

The above scenarios illustrate the need to provide a secure and reliable delivery of electronic documents over a data network.

BRIEF SUMMARY OF THE INVENTION

According to one embodiment of the present invention, a method for delivering an electronic document over a data network by a delivery system, includes: (a) storing in a delivery storage, by the delivery system, a delivery container received from a sender device, the delivery container comprising the electronic document, a recipient identity of a recipient device, and a location; (b) matching, by the delivery system, the recipient identity in the delivery container with a recipient entry in a recipient registry coupled to the delivery system; (c) obtaining a current location of the recipient device; (d) matching the current location of the recipient device with the location comprised in the delivery container, and (e) in response to the matching (b) and the matching (d), sending, by the delivery system, a notification of an availability of the electronic document to the recipient device over the data network.

In one aspect of the present invention, the delivery container further comprises a second location, wherein the matching (d) and the sending (e) further comprise: (d1) determining a location of the data network; (d2) matching the location of the data network with the second location; and (e1) in response to the matching (d) and the matching (d2), sending the notification of the availability of the electronic document to the recipient device over the data network.

In one aspect of the present invention, delivery container further comprises a schedule of one or more times during which the electronic document is accessible, wherein the matching (d) and sending (e) further comprise: (d1) obtaining a current time; (d2) determining that the current time is within the one or more times in the schedule; and (e1) in response to the determining (d2), sending the notification of the availability of the electronic document to the recipient device over the data network.

In one aspect of the present invention, the method further comprises: (f) receiving, by the delivery system, a document access request from the recipient device, the document access request comprising the recipient identity and a second current location of the recipient device; (h) matching, by the delivery system, the recipient identity in the document access request with the recipient entry in the recipient registry; (i) matching, by the delivery system, the second current location in the document access request with the location comprised in the delivery container, and (j) in response to the matching (h) and the matching (i), allowing, by the delivery system, access to the electronic document by the recipient device.

In one aspect of the present invention, the delivery container further comprises a schedule of one or more times during which the electronic document is accessible, wherein the matching (i) and the allowing (j) further comprise: (i1) obtaining a current time; (i2) determining that the current time is within the one or more times in the schedule; and (j1) in response to the matching (h), the matching (j), and the determining (i2), allowing the access to the electronic document by the recipient device.

In one aspect of the present invention, the method further comprises: (k) after the access to the electronic document by the recipient device, sending, by the delivery system, a second notification to the sender device comprising a status of a delivery of the electronic document to the recipient device.

In one aspect of the present invention, the method further comprises: (l) removing the electronic document from the delivery storage.

In one aspect of the present invention, the delivery container further comprises a schedule of one or more times during which the electronic document is accessible, wherein the electronic document is removed from the delivery storage after an expiration of the delivery container according to the one or more times in the schedule.

In one aspect of the present invention, wherein the storing (a) comprises: (a1) receiving, by the delivery system, the delivery container from the sender device, the delivery container further comprising a sender identity of the sender device; (a2) matching, by the delivery system, the sender identity with a sender entry in a sender registry coupled to the delivery system; and (a3) in response to the matching (a2), storing the delivery container in the delivery storage by the delivery system.

System and computer program products corresponding to the above-summarized methods are also described and claimed herein.

DETAILED DESCRIPTION OF THE INVENTION

Figure 1:
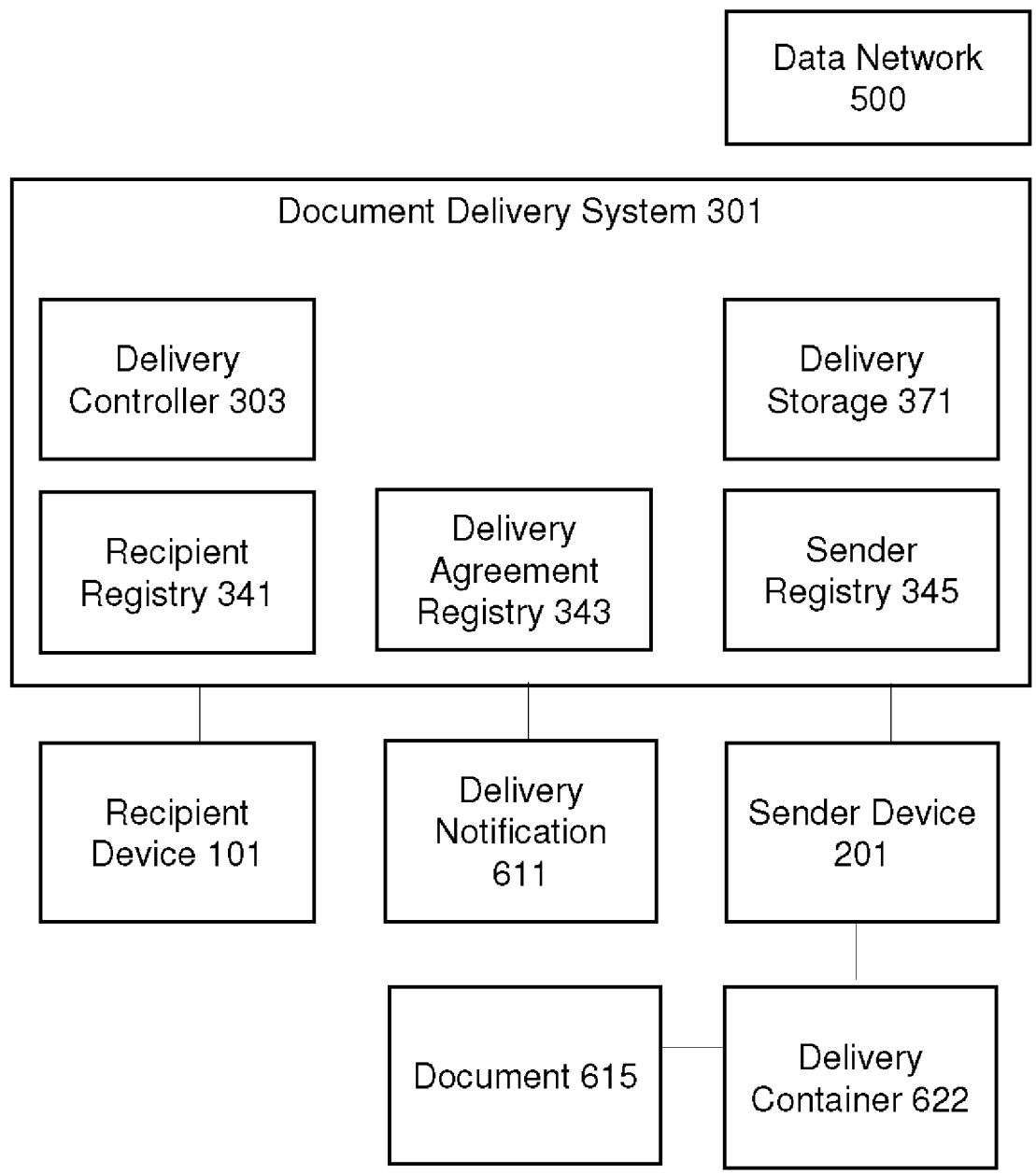
FIG. 1 illustrates an exemplary embodiment of a process to deliver an electronic document over a data network.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment" or "an embodiment" or "an exemplary embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an exemplary embodiment of a process to deliver an electronic document from a sender device to a recipient device. In one embodiment, electronic document 615 being delivered is a corporate document such as an agreement, a contract, an office letter, a client letter, a corporate email, a software program, a report, a sales presentation, a meeting minute, a memorandum, a partnership contract, a transcript, a product list, a product manual, an internal memo, a customer order, a human resource document, a performance review, a candidate interview report, a financial report, a document related to sales data, a directory, a blueprint, a prototype specification, a piece of software source code, and/or a confidential document. In one embodiment, document 615 is a personal electronic document such as a medical record, a bill, a bank statement, a will, a monthly statement, a manuscript, a photo, an electronic identity document, a tax return, a business plan, a picture, an electronic painting, a piece of writing, a certificate, a sales receipt, an invoice, a lease agreement, a grant deed, a loan agreement, a letter, an electronic book, a work document, a song, an album, a business document delivered to a person over a data network, and/or a document a person stores in a data network. In one embodiment, document 615 includes a commercial electronic document related to a purchase transaction such as a picture, an electronic book, an electronic magazine, an electronic newspaper, a video, a song, an album, a blue print, an architectural diagram, an invoice, a lease, an agreement, a letter, a user guide, a product specification, a manual, a receipt, a delivery notification, a message, a voice mail, a purchase order, a computer program product, a mobile app, and/or other transaction document. In one embodiment, document 615 includes an electronic currency, a Bitcoin, a virtual coin, and/or virtual currency. In one embodiment, document 615 includes private or confidential information, personal identity, personal or corporate sensitive information, and/or credit card information.

In one embodiment, document delivery system 301 includes one or more computing and/or hardware components, and provides document delivery services to a sender device 201. In one embodiment, document delivery system 301 includes delivery controller 303 which executes a piece of computing software to perform one or more processes for document delivery system 301 as described below. In one embodiment, document delivery system 301 performs a billing service which charges a user of sender device 201 based on the document delivery services. Document delivery system 301 receives document 615 and document delivery container 622 from sender device 201. Delivery container 622 includes attributes and instructions for delivering document 615. In one embodiment, document delivery system 301 stores document 615 and delivery container 622 in a delivery storage 371. Document delivery system 301 subsequently delivers document 615 to a recipient device 101 according to instructions included in delivery container 622.

In one embodiment, sender device 201 registers with document delivery system 301 for the delivery services prior to sending document 615 to document delivery system 301. In one embodiment, document delivery system 301 includes a sender registry 345 containing a registration of sender device 201. The registration of the sender device 201 is described further below with reference to FIG. 3.

In one embodiment, recipient device 101 registers with document delivery system 301 for delivery services in order to receive a document from document delivery system 301. In one embodiment, document delivery system 301 includes a recipient registry 341 containing a registration of recipient device 101. The registration of the recipient device 101 is described further below with reference to FIG. 4.

In one embodiment, either sender device 201 or recipient device 101 registers a delivery agreement with document delivery system 301, where the delivery agreement indicates that sender device 201 is authorized to send a document to recipient device 101 and recipient device 101 is authorized to receive a document from sender device 201. In one embodiment, document delivery system 301 includes a delivery agreement registry 343 containing a registration of the delivery agreement between sender device 201 and recipient device 101. The registration of the delivery agreement is described further below with reference to FIG. 5.

In one embodiment, upon receiving delivery container 622 and document 615 from sender device 201, document delivery system 301 determines sender device 201 is registered by matching the identity of the sender device 201 against sender registry 345. Document delivery system 301 retrieves from delivery container 622 an identity of recipient device 101 and confirms recipient device 101 is registered by matching the identity of recipient device 101 against recipient registry 341. In one embodiment document delivery system 301 determines sender device 201 and recipient device 101 have a registered delivery agreement by matching the identities of sender device 201 and recipient device 101 against delivery agreement registry 343. In one embodiment, upon verifying the identities of the sender device 201, the recipient device 101, and the delivery agreement, document delivery system 301 notifies recipient device 101 of the availability of the document 615 by sending a delivery notification 611 to recipient device 101. The receipt of a document for delivery and notification of the recipient device are described further below with reference to FIGS. 6 and 7. In one embodiment, recipient device 101 receives notification 611 and can respond by accessing document 615. The delivery of the document is described further below with reference to FIG. 8.

In one embodiment, document delivery system 301 notifies sender device 201 upon a successful access to the document 615 by recipient device 101. In one embodiment, document delivery system 301 charges sender device 201 a fee upon the successful delivery of document 615 to the recipient device 101. In one embodiment, document delivery system 301 charges recipient device 101 a fee upon the successful delivery of document 615 to the recipient device 101. In one embodiment document delivery system 301 provides free delivery services to recipient device 101 but charges sender device 201 a fee. In one embodiment, document delivery system 301 fails to deliver document 615, and in response, document delivery system 301 removes document 615 from delivery storage 371, for example by deleting the document 615 from delivery storage 371. In one embodiment, document delivery system 301 determines if it failed to deliver document 615 according to the instructions in the delivery container 622. If so, document delivery system 301 sends to the sender device 201 an indication of the failure to deliver document 615, and optionally includes a removal indication for the deletion of document 615 from delivery storage 371. The notification of the sender device and the removal of the document are described further below with reference to FIGS. 9 and 10.

In one embodiment, document delivery system 301, sender device 201 and recipient device 101 communicate over a data network 500. In one embodiment, data network 500 includes the Internet, a consumer home network, an enterprise network, a local area network, a hotspot, a data network in a store, a wireless network, a mobile broadband network, a cellular data network, a private network, a corporate network, or a network in a data center. In one embodiment, data network 500 includes a public cloud network, a private cloud network, a virtual private network (VPN), an ATM network, a Frame Relay network, a MPLS network, or an optical network.

Figure 2:
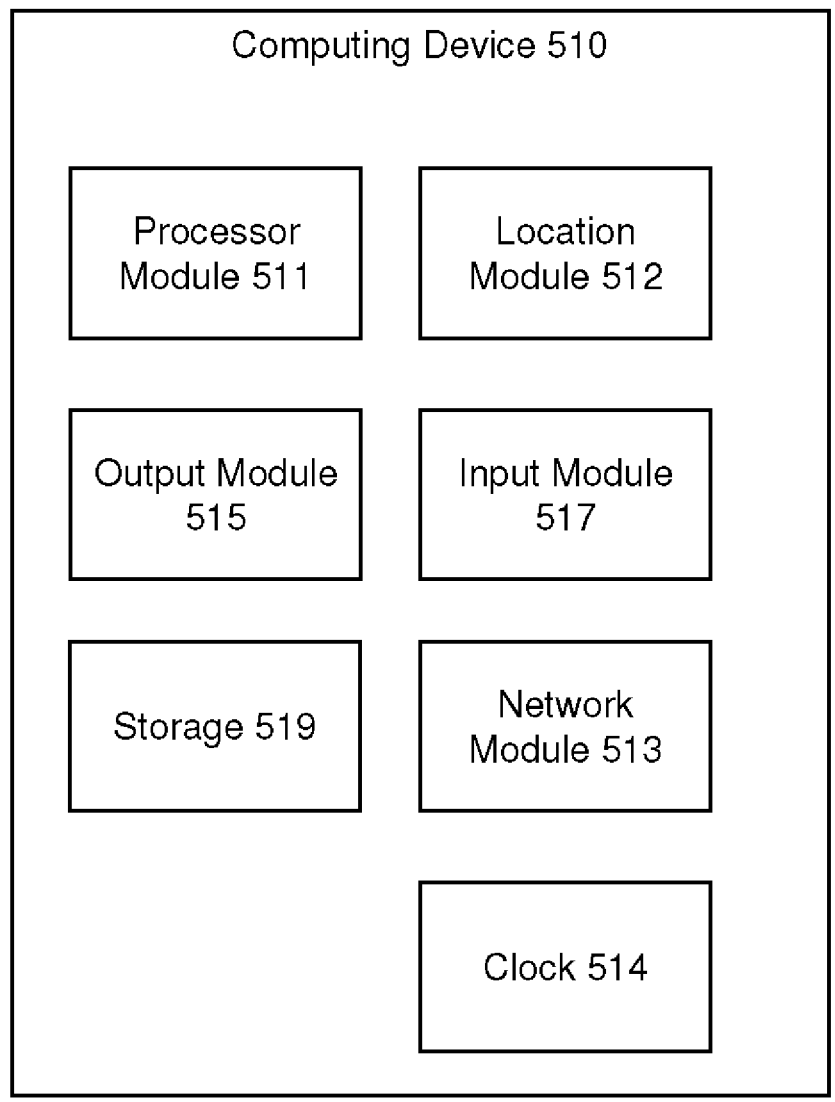
FIG. 2 illustrates an embodiment of a computing device.

FIG. 2 illustrates an exemplary embodiment of hardware components of a computing device which can be used as a recipient device, a sender device, a document delivery system, or a delivery controller. In one embodiment, computing device 510 includes a processor module 511, an output module 515, an input module 517, storage 519, a network module 513, a clock 514, and a location module 512. In one embodiment, processor module 511 includes one or more general processors, a multi-core processor, an application specific integrated circuit based processor, a system on a chip (SOC) processor or an embedded processor. In one embodiment, output module 515 includes a display for displaying images and text, an audio speaker, an image projector, one or more light indicator, data interfaces such as USB, HDMI, DVI, DisplayPort, Firewire, thunderbolt, or other forms of computer output. In one embodiment, input module 517 includes a physical or logical keyboard, buttons, keys, microphones, sensors such as optical sensor, infrared (IR) sensor, camera sensor, motion sensor, direction sensor, any sensor that is usable by a user to provide input to computing device 510. In one embodiment, storage 519 includes a main memory, a hard disk drive (HDD), a solid state drive (SSD), a memory card, a ROM module, a RAM module, a USB disk, a storage compartment, a data storage component or other storage component, not including signals per se. In one embodiment, network module 513 includes hardware and software to connect to a data network such as Ethernet, a wired network, a wireless network, a cellular network, a mobile network, a Bluetooth network, a NFC network, a personal area network (PAN), a WiFi network, or an optical network. Storage 519 includes executable instructions, which when executed by the processor module 511 of computing device 510, implement one or more functionalities of the current invention. In one embodiment, location module 512 includes a GPS module, a wireless signal sensor, and/or a processor to calculate a location based on received location signals. In one embodiment, location module 512 connects to network module 513 to use network module 513 to obtain signals of one or more network interfaces. In one embodiment, location module 512 connects to network module 513 to send a query to a network computer to determine a location based on received signals. In one embodiment, location module 512 connects to processor module 511 so as to use process module 511 to calculate or determine a location based on received signals.

In one embodiment, a location includes a geo-physical location, a building street address, a building name, a floor number, a room number, an office number, a suite number, a cubical number, a drawer identity, a cabinet identity, a location within a building structure, and/or a location indicated on a facility map. In one embodiment, a location includes a plurality of locations such as one location indicating a street address, one location indication a floor number, one location indicating a room number, and/or one location indicating a cube number. In one embodiment, a location includes a radius, range distance, and/or a boundary around another location.

In one embodiment computer device 510 includes a clock 514, which provides date and time information to computing device 510.

In one embodiment, computing device 510 does not include all of the illustrated modules. In one embodiment, computing device 510 does not have input module 517 or output module 515. In one embodiment, computing device 510 does not have location module 512 or clock 514. In one embodiment, computing device 510 connects to an external output module 515 or an external input module 517.

In one embodiment, recipient device 101 is a computing device. In one embodiment, recipient device 101 is implemented in a personal computer, a laptop, a smartphone, a smart watch, a smart wearable, a cashier device, a point of sales (POS) device, a wearable computing device, a smart medical device, a medical device, a robot, a hard-disk drive, a USB drive, a memory card device, a camera, a corporate phone, a tablet, a telepresence system, a smart home gadget, a set top box, a smart camera, a server computing system, an application server, or in any computing device accessing a document or a computing device acquiring document data and stores acquired document over a data network to a network computing device.

In one embodiment, delivery controller 303 is a computing device. In one embodiment, delivery controller 303 is a personal computer, a network storage, a server computer, a home storage device, a smart storage, a tablet, a media center, a video server, a photo server, an email server, a document management system, and/or a messaging server. In one embodiment, delivery controller 303 includes a cloud storage system, a cloud computing system, an enterprise application server system, a database management system, and/or a web portal.

In one embodiment, delivery controller 303 includes a software module residing in document delivery system 301, where document delivery system 301 is a computing device.

In one embodiment, sender device 201 is a computing device. In one embodiment, sender device 201 is implemented in a personal computer, a laptop, a smartphone, a smart watch, a smart wearable, a cashier device, a point of sales (POS) device, a wearable computing device, a smart medical device, a medical device, a robot, a hard-disk drive, a USB drive, a memory card device, a camera, a corporate phone, a tablet, a telepresence system, a smart home gadget, a set top box, a smart camera, a data acquisition device, and/or in more general a computing device sending document data over a data network.

Figure 3:
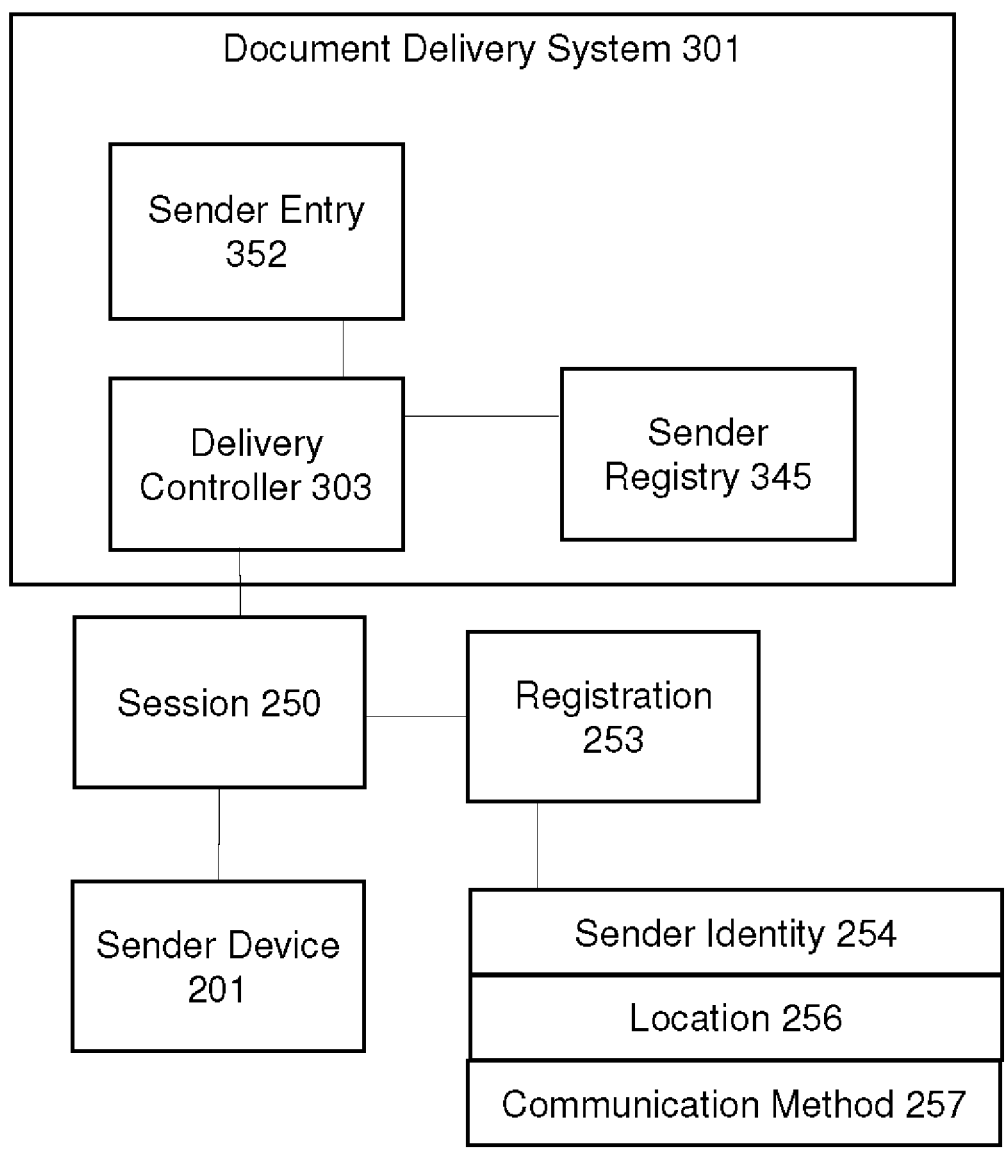
FIG. 3 illustrates an exemplary embodiment to register a sender device.

FIG. 3 illustrates an exemplary embodiment of a registration process by a sender device. In one embodiment, sender device 201 establishes a data communication session 250 with delivery system 301 and sends a registration 253 to delivery system 301. In one embodiment data communication session 250 includes a Web based session, for example, HTTP session, secure HTTP session, secure TCP session, a secure session such as IPSec, FTP, a file transfer session, a shared folder session, a shared document session, RPC, remote procedure call, a network or distributed file system session. In one embodiment, data communication session 250 includes a mobile network based session, a GPRS session, SMS message session, a mobile messaging session, a mobile or smartphone notification session. In one embodiment, delivery controller 303 of delivery system 301 receives registration 253 and retrieves a sender identity 254 of sender device 201 from the registration 253. Sender identity 254 can include, but not be limited to a user name, a telephone number, a product serial number, a RFID number, a merchant identity, a business identity, an email address, a social network user identity, a phone identity, an avatar name, a registration identity, a sequence of letters and numbers, a sequence of words and numbers, a piece of text, a URI, a universal telephone number, and/or an identity provided by delivery system 301. In one embodiment, sender device 201 includes a location 256 in registration 253, and delivery controller 303 retrieves location 256 from registration 253. In one embodiment, registration 253 includes a communication method 257. In one embodiment, communication method 257 includes, but is not limited to, a method to communicate with sender device 201, an email address where a method is to communicate is send an email, a phone number, a messaging protocol or method, a data communication protocol, a social network protocol, a social network identity, an instant messaging (IM) identity, and/or a SIP identity. In one embodiment, delivery controller 303 verifies the validity of sender identity 254, optionally verifies location 256 and communication method 257, and creates a sender entry 352 to store the retrieved sender identity 254, location 256, and communication method 257. In one embodiment, delivery controller 303 stores sender entry 352 in sender registry 345. In one embodiment, sender registry 345 includes, but is not limited to, a database, a table of entries, a storage, a database management system, a spreadsheet, a cloud storage, and/or a list of entries. In one embodiment, sender registry 345 includes a network computer providing access to the storage of sender registration entries.

In one embodiment, sender entry 352 further includes information related to billing and charging to be used to charge sender device 201 fees related to delivery services.

Figure 4:
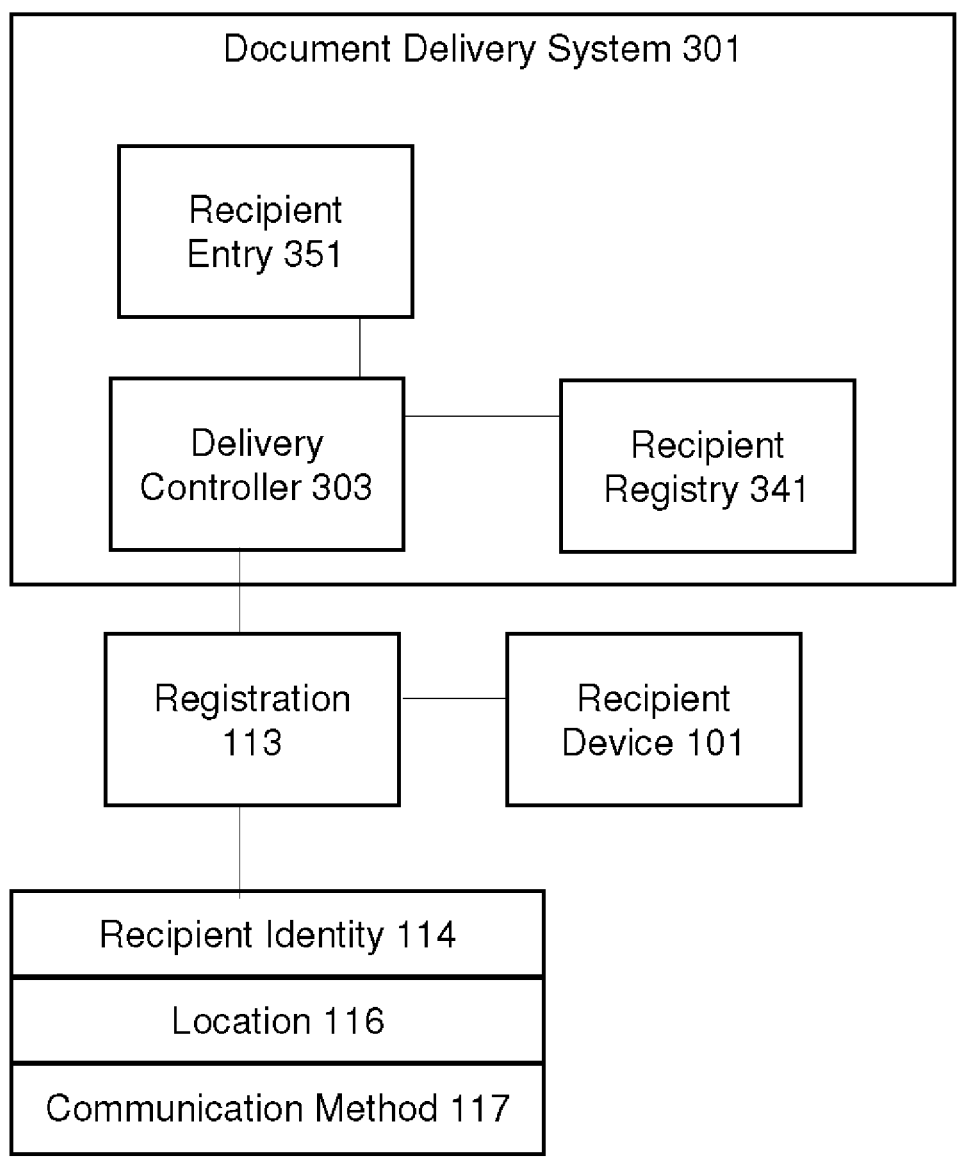
FIG. 4 illustrates an exemplary embodiment to register a recipient device.

FIG. 4 illustrates an exemplary embodiment of a registration process by a recipient device. In one embodiment, recipient device 101 establishes a data communication session with delivery system 301 and sends a registration 113 to delivery system 301. Delivery controller 303 of delivery system 301 receives registration 113 and retrieves a recipient identity 114 of recipient device 101 from the registration 113. In one embodiment, recipient device 101 includes a location 116 in registration 113. In one embodiment, registration 113 includes a communication method 117. Delivery controller 303 retrieves location 116 and communication method 117 from registration 113. In one embodiment, delivery controller 303 verifies the validity of recipient identity 114, optionally verifies location 116 and communication method 117, and creates a recipient entry 351 to store the retrieved recipient identity 114, location 116, and communication method 117. In one embodiment, delivery controller 303 stores recipient entry 351 in recipient registry 341.

In one embodiment, recipient entry 351 includes information related to billing and charging to be used to charge recipient device 101 fees related to delivery services.

In one embodiment, sender device 201 includes a data acquisition device such as a medical device, a personal health kit collecting heart rate and other personal health date, a smart home utility device, a smart light bulb, a smart home entertainment device, a hospital medical device collecting patient data, an industrial data acquisition device, a smart solar panel collecting data, a surveillance camera deployed to collect traffic data, and/or a device collecting various data. In one embodiment, sender device 201 packages the collected data and sends the data package to the delivery system 301 for delivery to the recipient device 101. In one embodiment, recipient device 101 includes a server of a business related to the collected data packets. The business may be a health insurance institute, a utility company, a smart home service company, a medical group, a manufacturer of a data acquisition device, a medical group, a hospital, a retailer, a video service provider, an advertisement agent, or any business entity interested in having the collected data. In one embodiment, delivery system 301 provides a delivery service to deliver the data packages from sender device 201 to recipient device 101, and to store the data packages until at least recipient device 101 receives the data packages. In one embodiment, a user using the sender device 201 and a business using the recipient device 101 establish a delivery agreement with delivery system 301, such that recipient device 101 may receive data packages according to the delivery agreement from a known and contracted source and the sender device 201 may deliver data packages to a contracted recipient according to the delivery agreement.

In one embodiment, sender device 201 is used by a business entity to deliver data or document to recipient device 101 used by a customer of the business entity. In one embodiment, the business entity is: a financial institute such as a bank, a mortgage company, or an investment firm; a medical institute such as a clinic, a hospital, or a health insurance company, a media institute such as a publisher, a news publisher, a book store, a video service provider, an online music service provider, a utility company, a retail store, an online retail store, a merchant, or any business entity selling electronic data or document, and/or a business entity intended to delivery an important document or an urgent message to customers. In one embodiment, delivery system 301 provides delivery services to the business entity to deliver the document or goods to the customers. The business entity uses sender device 201 to send the electronic documents to delivery system 301, which then delivers the electronic documents to a customer using recipient device 101. In one embodiment, delivery system 301 stores the electronic documents at least until the recipient device 101 receives the documents. In one embodiment, recipient device 101 includes a smart phone, a smart home device, an electronic device receiving operating instructions, a personal computing device, a business computing device, a printer, a 3D printer, a television set, a e-magazine reader, a e-book reader, an automobile related computing device, and/or any computing device to consume the delivered documents.

Figure 5:
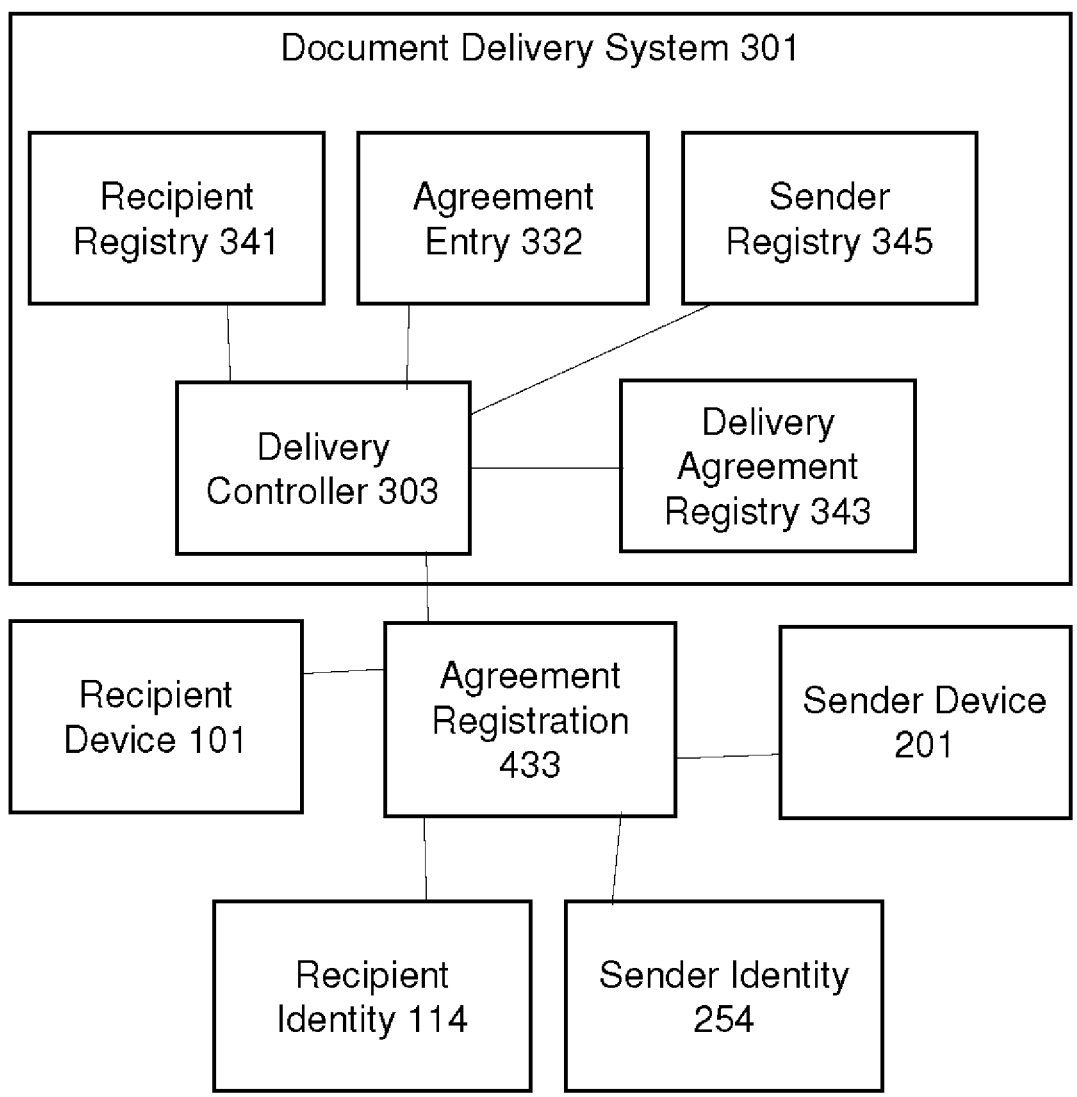
FIG. 5 illustrates an exemplary embodiment to register a document delivery agreement between a sender and a recipient.

FIG. 5 illustrates an exemplary embodiment of a delivery agreement registration process. In one embodiment, sender device 201 or recipient device 101 establishes a data communication session with delivery system 301 and sends a delivery agreement registration 433 to delivery system 301. Delivery agreement registration 433 includes sender identity 254 of sender device 201 and recipient identity 114 of recipient device 101. In one embodiment, delivery controller 303 of delivery system 301 receives agreement registration 433, and retrieves recipient identity 114 and sender identity 254 from the agreement registration 433. In one embodiment, delivery controller 303 matches sender identity 254 against sender registry 345 to verify that sender identity 254 matches a sender entry 352 in sender registry 345. In one embodiment, delivery controller 303 matches recipient identity 114 against recipient registry 341 to verify that recipient identity 114 matches a recipient entry in recipient registry 341. In one embodiment, the delivery controller 303 matches both sender identity 254 to the sender registration in the sender registry 345 and the recipient identity 114 to the recipient entry in the recipient registry 341. After verifying the sender identity 254 and the recipient identity 114, delivery controller 303 generates an agreement entry 332 to store agreement registration 433, along with the sender identity 254 and the recipient identity 114. In one embodiment, delivery controller 303 stores agreement entry 332 into a delivery agreement registry 343. In one embodiment, agreement registration 433 includes other information, as described further below.

Figure 6:
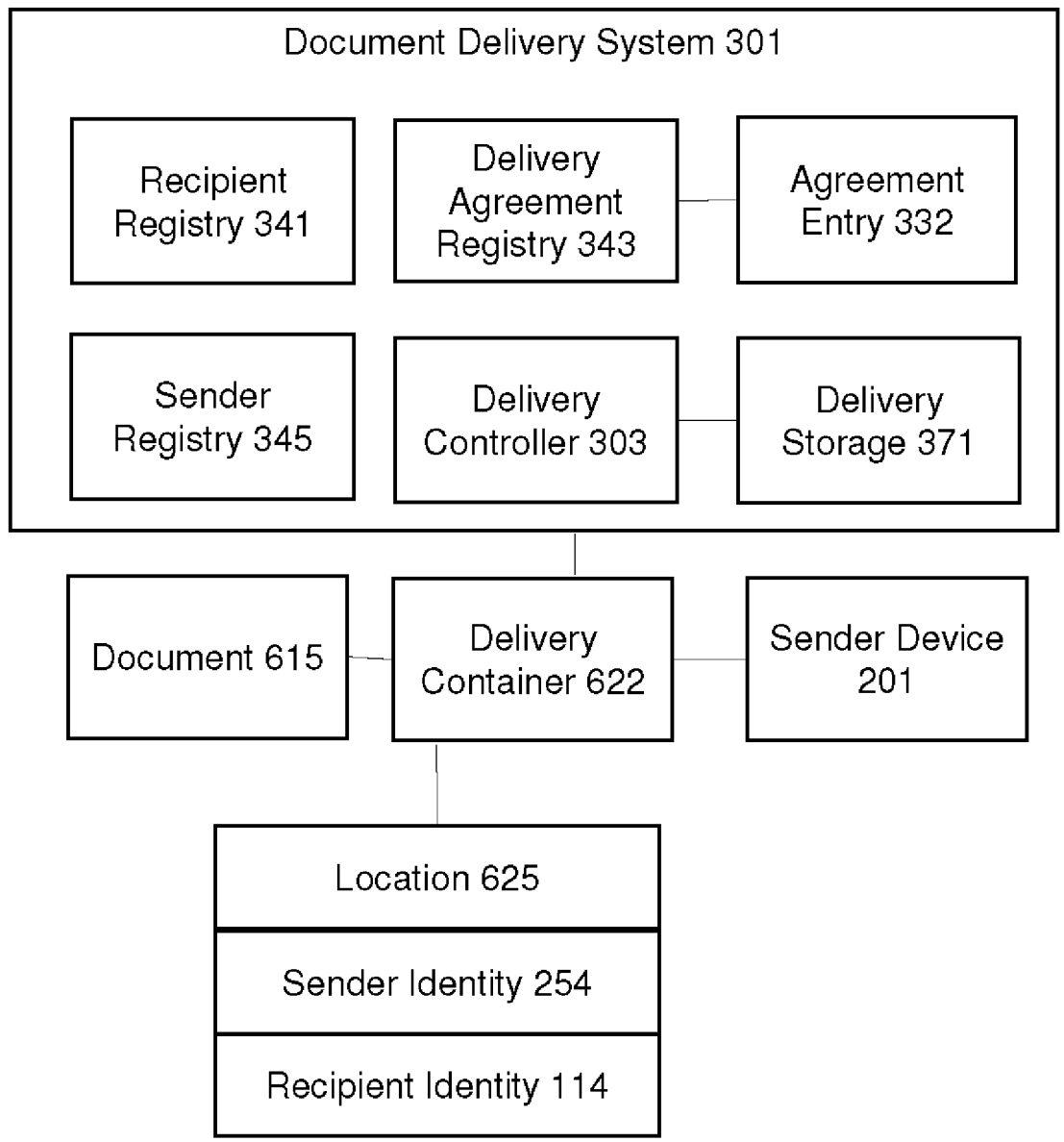
FIG. 6 illustrates an exemplary embodiment to receive a document for delivery from a sender device.

FIG. 6 illustrates an exemplary embodiment of a sending device sending a document for delivery. In one embodiment, sender device 201 sends a delivery container 622 to delivery system 301 over a data communication session. In one embodiment, delivery container 622 includes document 615, sender identity 254, and recipient identity 114. In one embodiment, delivery container 622 does not include sender identity 254, but instead, document delivery system 301 obtains sender identity 254 from the data communication session metadata. In one embodiment, delivery controller 303 of delivery system 301 obtains the recipient identity 114 and sender identity 254 from delivery container 622. In one embodiment, delivery controller 303 matches sender identity 254 against a sender entry 352 (FIG. 3) in the sender registry 345 to verify the validity of the sender identity 254. In one embodiment, delivery controller 303 matches recipient identity 114 against a recipient entry 351 (FIG. 4) in the recipient registry 341 to verify the validity of recipient identity 114. In one embodiment, delivery controller 303 matches sender identity 254 and recipient identity 114 against an agreement entry 332 (FIG. 5) in the delivery agreement registry 343. After delivery controller 303 verifies sender identity 254, recipient identity 114, and agreement entry 332, delivery controller 303 stores delivery container 622 in delivery storage 371, from which the document 615 included in delivery container 622 may be delivered at a later time.

In one embodiment, delivery controller 303 fails to verify sender identity 254, fails to verify recipient identity 114, and/or fails to find a matching agreement entry in delivery agreement registry 343, and in response, delivery controller 303 rejects delivery container 622. In one embodiment, delivery controller 303 notifies sender device 201 of a reason for rejecting delivery container 622. In one embodiment, delivery controller 303 fails to verify sender identity 254 due to not finding a matching sender entry in sender registry 345, or to finding a matching sender entry 352 in sender registry 345 that is expired, or to finding a mismatch between a location contained in a matching sender entry 352 and a location 625 included in delivery container 622. In one embodiment, delivery controller 303 fails to verify recipient identity 114 due to not finding a matching recipient entry in recipient registry 341, or to finding a matching recipient entry 351 in recipient registry 341 that is expired, or to finding a mismatch between a location contained in a matching recipient entry 351 and location 625 included in delivery container 622. In one embodiment, delivery controller 303 fails to verify delivery agreement registry 343 due to not finding a matching agreement entry in delivery agreement registry 343, or to finding a matching agreement entry in delivery agreement registry 343 that is expired.

In one embodiment, delivery container 622 includes a location 625 indicating a required location of delivery storage 371. In one embodiment, document delivery system 301 includes a location module 512 (see FIG. 2). Delivery controller 303 determines, using the location module 512, a location of delivery storage 371, matches the location of delivery storage 371 against location 625, and stores delivery container 622 into delivery storage 371 when the matching of locations is successful.

In one embodiment, location 625 includes a plurality of locations used for any combination of purposes according to the aforementioned usages.

In one embodiment, delivery container 622 includes additional attributes and information to assist delivery controller 303 in delivering document 615 to a recipient device 101. The additional attributes and information are described further below. In one embodiment, delivery controller 303 adds additional information such as billing information to delivery container 622 for charging purposes.

Figure 7:
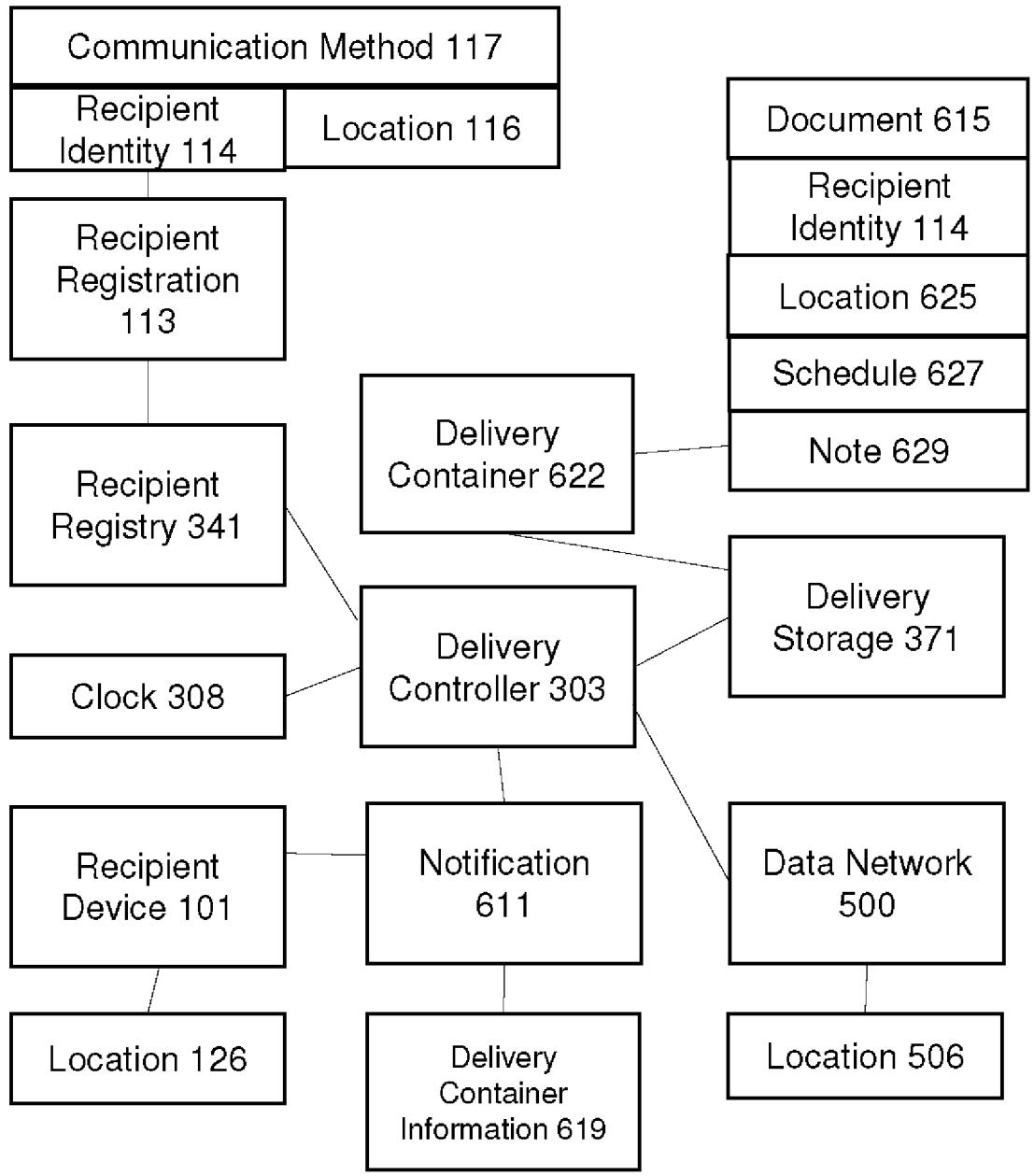
FIG. 7 illustrates an exemplary embodiment to deliver a delivery notification to a recipient device.

FIG. 7 illustrates an exemplary embodiment of delivering a document container to a recipient device. In one embodiment, delivery container 622 includes a delivery schedule 627. The delivery schedule 627 defines the times during the document 615 is accessible by a recipient device 101. In one embodiment, delivery controller 303 connects to a clock 308, and determines a time indicated by the clock 308 matches a time in the delivery schedule 627. In response to a match, delivery controller 303 proceeds with the processing of delivery container 622, as described above. In one embodiment, schedule 627 includes a time duration, a time range such as 8 am-5 pm, a range of days such as weekdays, "Mar. 3-15, 2016", a season such as Summer, a repeated schedule such as "every Monday", a deadline such as "Jun. 22, 2019", or a combination of schedules such as "8 am-10 am every Monday from Mar. 3, 2017 to May 14, 2019".

In one embodiment, delivery controller 303 processes delivery container 622 prior to storing delivery container 622 into delivery storage 371. In one embodiment, delivery controller 303 retrieves delivery container 622 from delivery storage 371 for processing.

In one embodiment of processing delivery container 622, delivery controller 303 retrieves a recipient identity 114 from delivery container 622. Delivery controller 303 matches recipient identity 114 against recipient registry 341 to obtain a matching recipient entry 351, and obtains communication method 117 from recipient entry 351. Delivery controller 303 sends to recipient device 101 a delivery notification 611 using communication method 117. In one embodiment, delivery controller 303 includes in notification 611 a piece of note 629 retrieved from delivery container 622, such as a piece of text, a title of document 615, a greeting from sender of delivery container 622, and/or a piece of information meaningful for a user of recipient device 101. In one embodiment, note 629 includes the full document 615, an abstract of the document 615, or an excerpt of the document 615. In one embodiment delivery controller 303 includes in notification 611 a piece of delivery container information 619 such as an identity, a number, a name, a word, an alpha-numeric string, and/or an index, which delivery controller 303 may use to identify the delivery container 622.

In one embodiment, delivery container 622 includes location 625 specifying a required location of data network 500 to deliver notification 611. Delivery controller 303 determines a location 506 of data network 500 and matches location 506 to location 625. In one embodiment, location 506 is a current location of data network 500. When there is a match, delivery controller 303 delivers notification 611 using data network 500. When there is not a match, delivery controller 303 does not use data network 500 to deliver the notification 611. In one embodiment, delivery controller 303 tries to deliver notification 611 using data network 500 again at a later time, as specified by schedule 627.

In one embodiment, location 625 indicates a required location of recipient device 101. Delivery controller 303 obtains a location 126, which may be a current location of recipient device 101, from recipient device 101 and matches location 126 against location 625. If there is a match, delivery controller 303 sends notification 611 to recipient device 101. If there is no match, delivery controller 303 does not send notification 611. In one embodiment, delivery controller 303 tries to deliver notification 611 again at a later time, as specified by schedule 627. In one embodiment, recipient entry 351 includes a location 116. Delivery controller 303 may match location 116 against location 126, and in response, sends the notification 611.

In one embodiment, delivery controller 303 establishes a communication session with recipient device 101 using communication method 117, obtains location 126 from recipient device 101 and then performs the matching of location 126 and location 625. In one embodiment, delivery controller 303 obtains location 126 from another network computer (not shown).

In one embodiment, notification 611 includes schedule 627, allowing recipient device 101 to request a delivery of document 615 to the recipient device 101 according to schedule 627.

Figure 8:
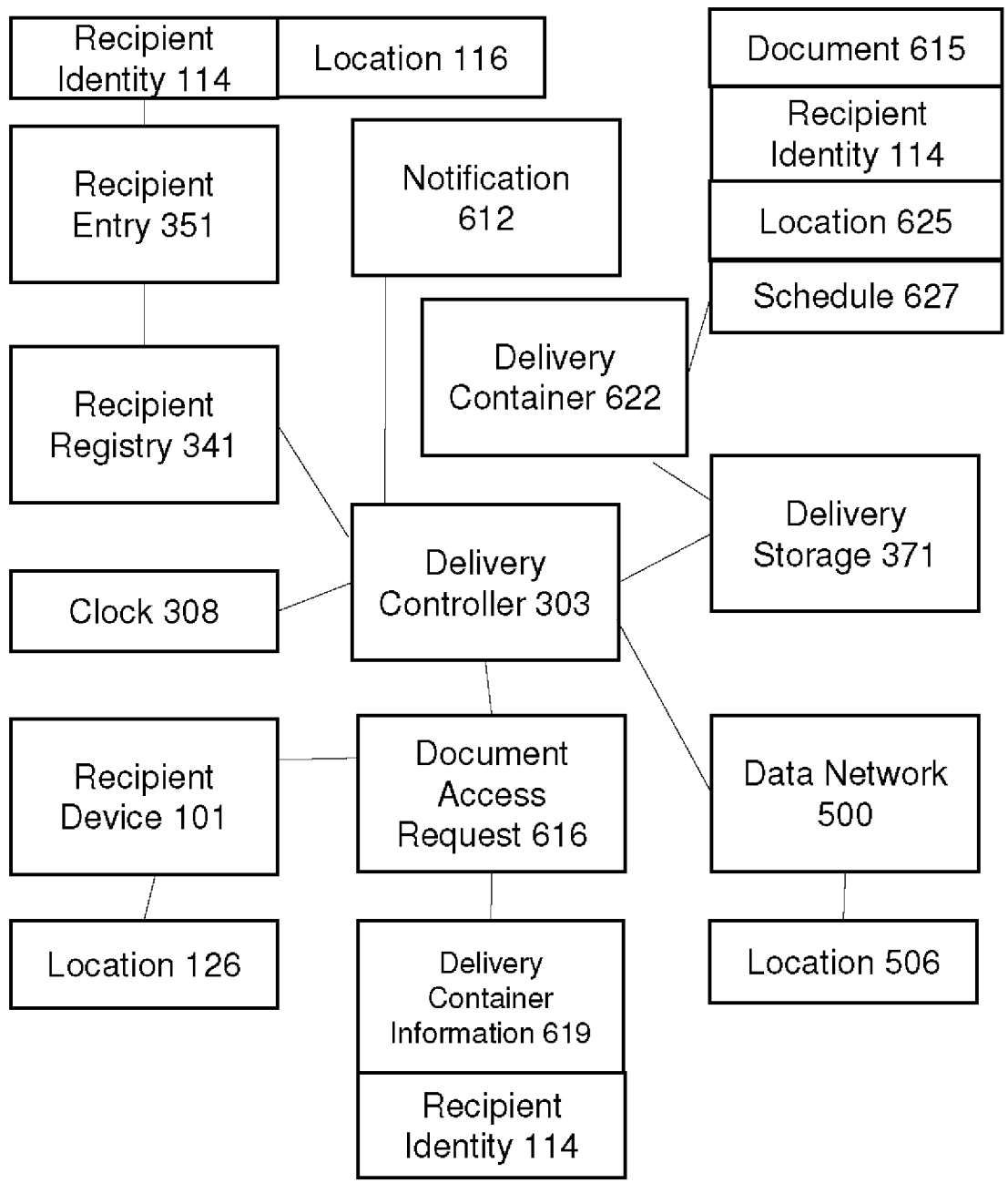
FIG. 8 illustrates an exemplary embodiment to deliver a document to a recipient device.

In one embodiment, recipient device 101 receives notification 611, and uses notification 611 to access document 615, according to an exemplary embodiment illustrated in FIG. 8. In one embodiment, recipient device 101 retrieves delivery container information 619 to generate a document access request 616, and sends document access request 616 to delivery controller 303 over data network 500, in order to access document 615. In one embodiment, recipient device 101 obtains a location 126 and includes location 126 in document access request 616. In one embodiment, recipient device 101 includes recipient identity 114 in document access request 616.

In one embodiment, delivery controller 303 receives document access request 616, and retrieves recipient identity 114 and delivery container information 619 from document access request 616. In one embodiment, delivery controller 303 verifies recipient identity 114 by matching it against recipient registry 341 to obtain a matching recipient entry 351. Delivery controller 303 matches delivery container information 619 against information in delivery storage 371 to obtain delivery container 622.

In one embodiment, delivery controller 303 verifies delivery container 622 by matching recipient identity 114 against delivery container 622. In one embodiment, delivery controller 303 verifies location 625 of delivery container 622 matches location 126 of document access request 616, and optionally matches a location attribute of recipient entry 351 against the location 126 in the document access request 616. In one embodiment, delivery controller 303 checks clock 308 to obtain a receiving time of document access request 616, and determines if the receiving time matches a time in the schedule 627 of delivery container 622. In one embodiment, delivery controller 303 obtains a location 506 of data network 500 and matches location 506 against location 625 of delivery container 622. Upon verifying delivery container 622, delivery controller 303 allows recipient device 101 to access document 615. In one embodiment, delivery controller 303 sends document 615 to recipient 101 over data network 500. In one embodiment, delivery controller 303 allows access to document 615 by a software application, such as a word processor, a media player, an audio or video player, an e-book reader, an office document application, a slide presentation, a web browser, a video game application, or a collaboration application, running on recipient device 101.

In one embodiment, if delivery controller 303 fails to verify delivery container 622 when one or more of the above matching fails, delivery controller 303 does not allow the recipient device 101 to access document 615. In one embodiment, recipient device 101 sends another document access request 616 at a later time to access document 615, and the verification process above is repeated.

In one embodiment, delivery controller 303 sends delivery notification 612 to a sender device 201 of delivery container 622. The delivery notification 612 may indicate a failed attempt to deliver document 615 to recipient device 101, a failed attempt to access document 615 by the recipient device 101, a successful transmission of document 615 to the recipient device 101, or a successful access to document 615 by the recipient device 101. Embodiments of delivering notification 612 to a sender device is explained below.

In one embodiment, delivery controller 303 removes document 615 from delivery storage 371 after recipient device 101 accesses document 615. In one embodiment, delivery controller 303 does not remove document 615 even after recipient device 101 had accessed document 615. In this embodiment, delivery controller 303 may allow recipient device 101 to continue accessing document 615 as long as delivery container 622 is verified and according to the schedule 627.

Figure 9:
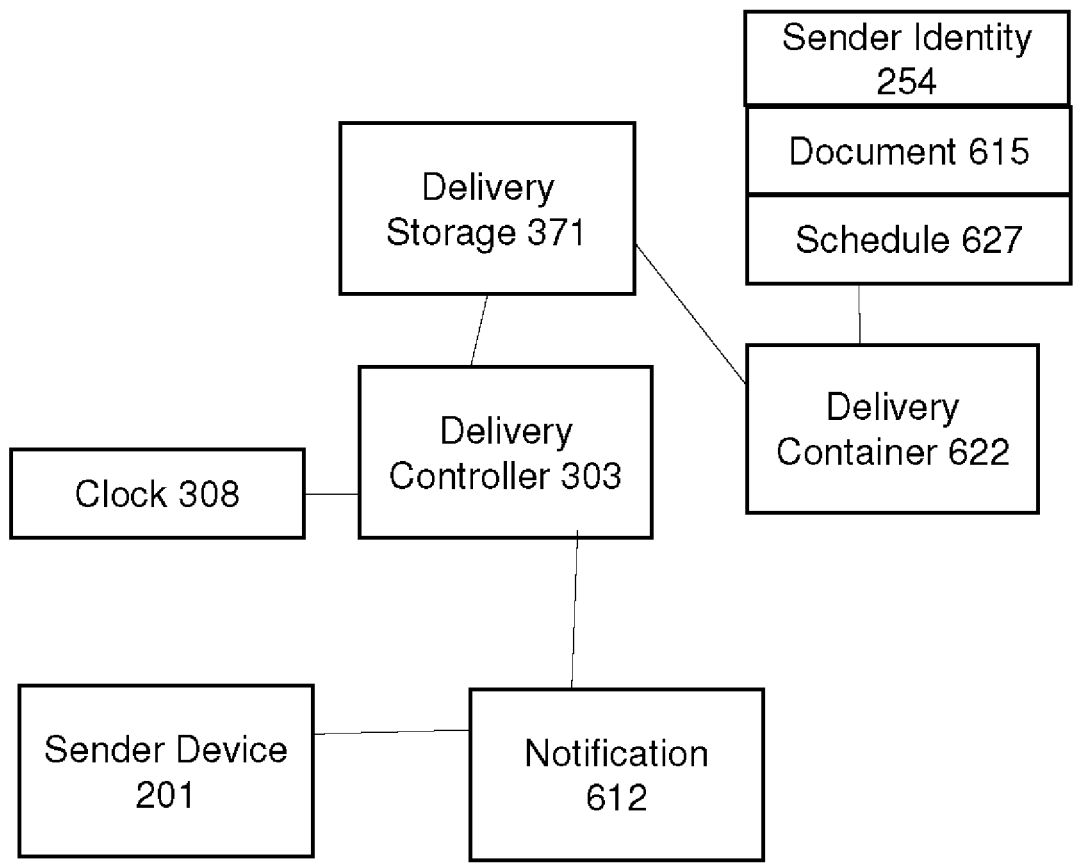
FIG. 9 illustrates an exemplary embodiment to deliver a notification to a sender device.

FIG. 9 illustrates an exemplary embodiment of removing document to be delivered by delivery controller. In one embodiment, delivery controller 303 determines whether delivery container 622 is expired according to the schedule 627. In one embodiment, delivery controller 303 checks clock 308 to obtain a current time and matches the current time with schedule 627 to determine if the delivery container 622 has expired. In one embodiment, delivery controller 303 uses clock 308 to set an expiration timer based on schedule 627. Once delivery controller 303 determines that the delivery container 622 has expired according to the schedule 627, delivery controller 303 removes document 615 from delivery storage 371.

In one embodiment, delivery controller 303 sends a document removal notification 612 to sender device 201 in response to the successful removal of the document 615 from delivery storage 371.

Figure 10:
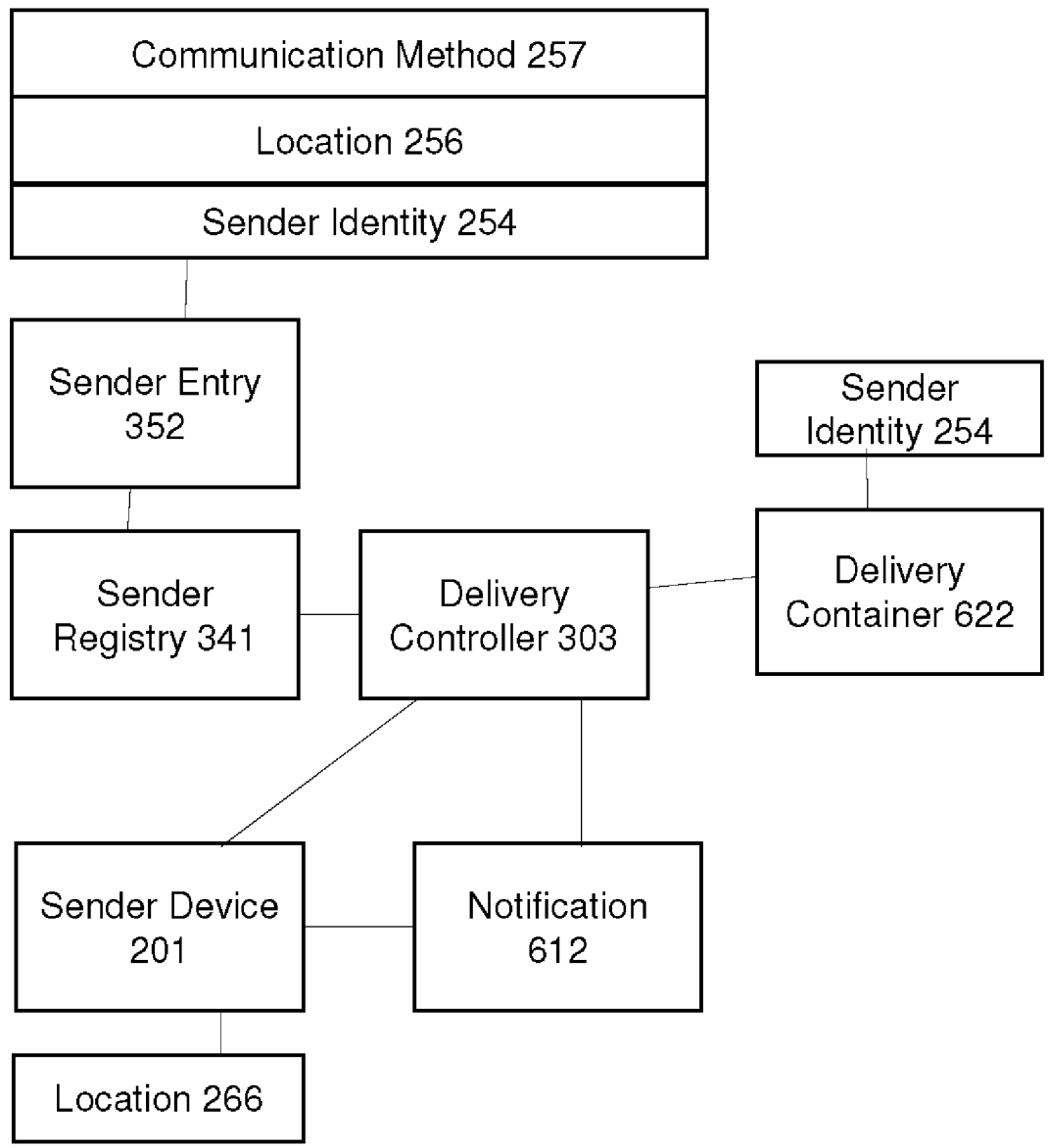
FIG. 10 illustrates an exemplary embodiment to remove a stored document.

FIG. 10 illustrates an exemplary embodiment to deliver a notification to a sender device. In one embodiment, delivery controller 303 obtains sender identity 254 from delivery container 622, and matches sender identity 254 against sender registry 341 to obtain a matching sender entry 352. Delivery controller 303 obtains communication method 257 from sender entry 352, and uses communication method 257 to establish a communication session with the sender device 201. Using the communication method 257, delivery controller 303 sends the notification 612 to the sender device 201. In one embodiment, sender entry 352 includes location 256. Delivery controller 303 may obtain a location 266 of sender device 201, determines that location 256 matches location 266, and in response, sends the notification 612 to the sender device 201.

In one embodiment, the notification 612 sent to a sender device 201 or a recipient device 101 includes a status of delivery, an indication of a removal of a document, an expiration notice, or a billing event.

In one embodiment, a sender entry 352 or a recipient entry 351 further contains billing information, accumulated service charge, delivery transactions, and/or other accounting records allowing delivery system to charge the sender or the recipient. In one embodiment, delivery controller 303 updates a sender entry 352 or a recipient entry 351 to record a delivery transaction or event.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for secure delivery of an electronic document from a sender device to a recipient device over a data network by a delivery system, comprising:
    (a) storing in a delivery storage, by the delivery system, a delivery container received from the sender device, the delivery container comprising the electronic document, a recipient identity of the recipient device, a plurality of locations comprising a first location and a second location, wherein the storing comprises:
        (a1) determining a first current geo-physical location of the delivery storage;
        (a2) comparing the first current geo-physical location with the first location; and
        (a3) in response to the first current geo-physical location matching the first location, storing the delivery container in the delivery storage;
    (b) receiving, by the delivery system, a request to access the electronic document from the recipient device;
    (c) obtaining, by the delivery system, a second current geo-physical location of the recipient device;
    (d) comparing, by the delivery system, the second current geo-physical location with the second location; and
    (e) in response to the second current geo-physical location matching the second location, sending, by the delivery system, the electronic document to the recipient device.

2. The method of claim 1, wherein the plurality of locations further comprises a third location, wherein the comparing (d) and the sending (e) further comprise:
    (d1) determining a third current geo-physical location of the data network;
    (d2) comparing the third current geo-physical location with the third location; and
    (e1) in response to the second current geo-physical location matching the second location, and in response to the third current geo-physical location with the third location, sending the electronic document to the recipient device over the data network.

3. The method of claim 1, wherein the plurality of locations further comprises a third location, wherein the method further comprises:
    (f) after the sending of the electronic document to the recipient device, obtaining a third current geo-physical location of the sender device;
    (g) comparing the third current geo-physical location with the third location; and
    (h) in response to the third current geo-physical location matching the third location, sending a notification of the sending of the electronic document to the sender device.

4. The method of claim 1, wherein the receiving (b) comprises:
- (b1) retrieving, by the delivery system, the recipient identity from the delivery container,
- (b2) sending, by the delivery system, a notification of an availability of the electronic document to the recipient device; and
- (b3) after the sending of the notification, receiving, by the delivery system, the request to access the electronic document from the recipient device, the request comprising the second current geo-physical location.

5. The method of claim 1, further comprising:
- (f) after the sending of the electronic document to the recipient device, recording a delivery event in a sender entry coupled to the delivery system, the sender entry being associated with a sender identity of the sender device.

6. The method of claim 1, further comprising:
- (f) after the sending of the electronic document to the recipient device, sending a notification of a billing event to the sender device.

7. The method of claim 1, wherein the delivery container further comprises billing information for charging purposes, wherein the method further comprises:
- (f) after the sending of the electronic document to the recipient device, charging, by the delivery system, the sender device or the recipient device a fee according to the billing information.

8. The method of claim 1, wherein a sender entry associated with the sender device comprises billing information, wherein the method further comprises:
- (f) after the sending of the electronic document to the recipient device, charging, by the delivery system, the sender device a fee according to the billing information.

9. A non-transitory computer readable medium comprising computer readable program code embodied therein for secure delivery of an electronic document from a sender device to a recipient device over a data network, wherein when executed by a processor module causes the processor module to:
- (a) store in a delivery storage a delivery container received from the sender device, the delivery container comprising the electronic document, a recipient identity of the recipient device, a plurality of locations comprising a first location and a second location, wherein the storing comprises:
  - (a1) determine a first current geo-physical location of the delivery storage;
  - (a2) compare the first current geo-physical location with the first location; and
  - (a3) in response to the first current geo-physical location matching the first location, store the delivery container in the delivery storage;
- (b) receive a request to access the electronic document from the recipient device;
- (c) obtain a second current geo-physical location of the recipient device;
- (d) compare the second current geo-physical location with the second location; and
- (e) in response to the second current geo-physical location matching the second location, send the electronic document to the recipient device.

10. The medium of claim 9, wherein the plurality of locations further comprises a third location, wherein the compare (d) and the send (e) further comprise:
- (d1) determine a third current gee-physical location of the data network;
- (d2) compare the third current gee-physical location with the third location; and
- (e1) in response to the second current gee-physical location matching the second location, and in response to the third current gee-physical location with the third location, send the electronic document to the recipient device over the data network.

11. The medium of claim 9, wherein the plurality of locations further comprises a third location, wherein the processor module is further caused to:
- (f) after the sending of the electronic document to the recipient device, obtain a third current geo-physical location of the sender device;
- (g) compare the third current geo-physical location with the third location; and
- (h) in response to the third current geo-physical location matching the third location, send a notification of the sending of the electronic document to the sender device.

12. The medium of claim 9, wherein the receive (b) comprises:
- (b1) retrieve the recipient identity from the delivery container,
- (b2) send a notification of an availability of the electronic document to the recipient device; and
- (b3) after the sending of the notification, receive the request to access the electronic document from the recipient device, the request comprising the second current geo-physical location.

13. The medium of claim 9, wherein the processor module is further caused to:
- (f) after the sending of the electronic document to the recipient device, record a delivery event in a sender entry, the sender entry being associated with a sender identity of the sender device.

14. The medium of claim 9, wherein the processor module is further caused to:
- (f) after the sending of the electronic document to the recipient device, send a notification of a billing event to the sender device.

15. The medium of claim 9, wherein the delivery container further comprises billing information for charging purposes, wherein the processor module is further caused to:
- (f) after the sending of the electronic document to the recipient device, charge the sender device or the recipient device a fee according to the billing information.

16. The medium of claim 9, wherein a sender entry associated with the sender device comprises billing information, wherein the processor module is further caused to:
- (f) after the sending of the electronic document to the recipient device, charge the sender device a fee according to the billing information.

17. A delivery system, comprising:
a processor module; and
a computer readable medium comprising computer readable program code embodied therein for secure delivery of an electronic document from a sender device to a recipient device over a data network, wherein when executed by the processor module causes the processor module to:
- (a) store in a delivery storage a delivery container received from the sender device, the delivery container comprising the electronic document, a recipient identity of the recipient device, a plurality of locations comprising a first location and a second location, wherein the storing comprises:
- (a1) determine a first current geo-physical location of the delivery storage;
- (a2) compare the first current geo-physical location with the first location; and
- (a3) in response to the first current geo-physical location matching the first location, store the delivery container in the delivery storage;
- (b) receive a request to access the electronic document from the recipient device;
- (c) obtain a second current geo-physical location of the recipient device;
- (d) compare the second current geo-physical location with the second location; and
- (e) in response to the second current geo-physical location matching the second location, send the electronic document to the recipient device.

18. The system of claim 17, wherein the plurality of locations further comprises a third location, wherein the compare (d) and the send (e) further comprise:
- (d1) determine a third current geo-physical location of the data network;
- (d2) compare the third current geo-physical location with the third location; and
- (e1) in response to the second current geo-physical location matching the second location, and in response to the third current geo-physical location with the third location, send the electronic document to the recipient device over the data network.

19. The system of claim 17, wherein the plurality of locations further comprises a third location, wherein the processor module is further caused to:
- (f) after the sending of the electronic document to the recipient device, obtain a third current geo-physical location of the sender device;
- (g) compare the third current geo-physical location with the third location; and
- (h) in response to the third current geo-physical location matching the third location, send a notification of the sending of the electronic document to the sender device.

20. The system of claim 17, wherein the receive (b) comprises:
- (b1) retrieve the recipient identity from the delivery container,
- (b2) send a notification of an availability of the electronic document to the recipient device; and
- (b3) after the sending of the notification, receive the request to access the electronic document from the recipient device, the request comprising the second current geo-physical location.

21. The system of claim 17, wherein the processor module is further caused to:
- (f) after the sending of the electronic document to the recipient device, record a delivery event in a sender entry, the sender entry being associated with a sender identity of the sender device.

22. The system of claim 17, wherein the processor module is further caused to:
- (f) after the sending of the electronic document to the recipient device, send a notification of a billing event to the sender device.

23. The system of claim 17, wherein the delivery container further comprises billing information for charging purposes, wherein the processor module is further caused to:
- (f) after the sending of the electronic document to the recipient device, charge the sender device or the recipient device a fee according to the billing information.

24. The system of claim 17, wherein a sender entry associated with the sender device comprises billing information, wherein the processor module is further caused to:
- (f) after the sending of the electronic document to the recipient device, charge the sender device a fee according to the billing information.

* * * * *